(No Model.)  3 Sheets—Sheet 1.
J. H. GUEST.
SUPPLY SYSTEM FOR ELECTRIC RAILWAYS.
No. 537,416. Patented Apr. 9, 1895.
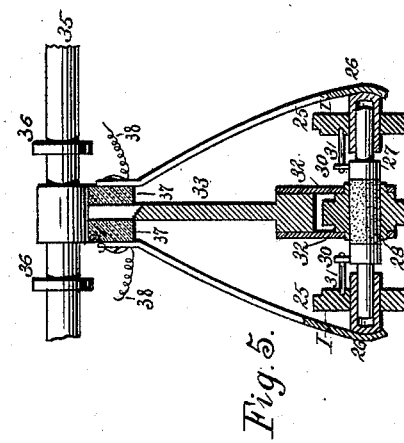
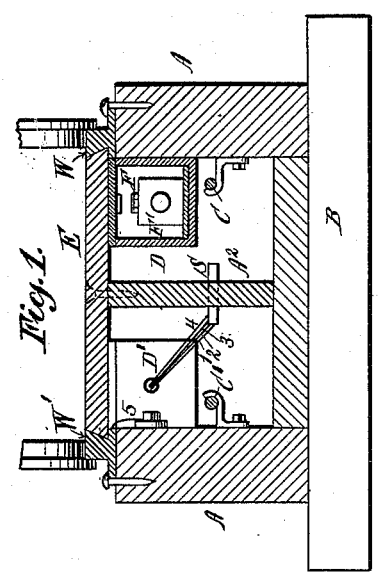
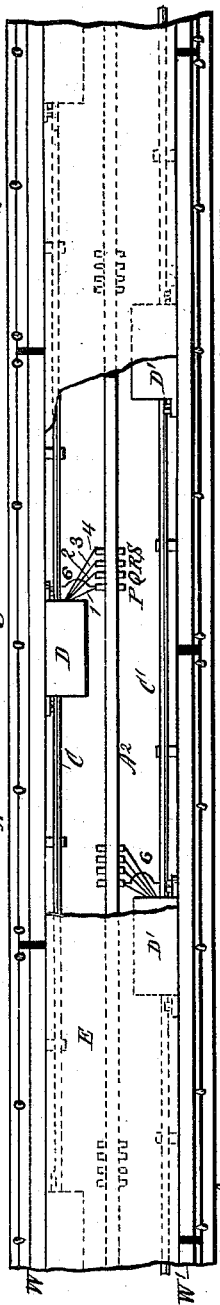
Witnesses:
D. W. Gardner.
Wm. H. Capel.
Inventor:
John H. Guest.
By H. C. Townsend
Attorney.

(No Model.) 3 Sheets—Sheet 2.
J. H. GUEST.
SUPPLY SYSTEM FOR ELECTRIC RAILWAYS.
No. 537,416. Patented Apr. 9, 1895.
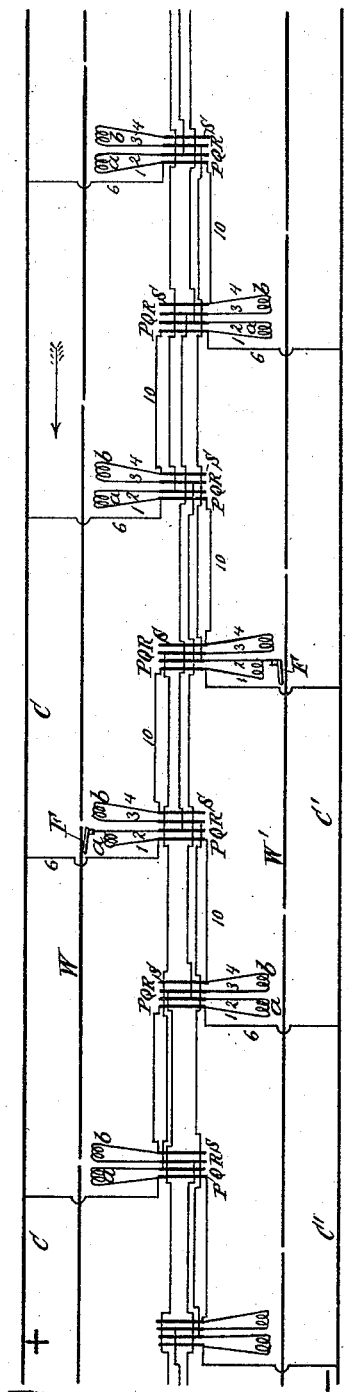
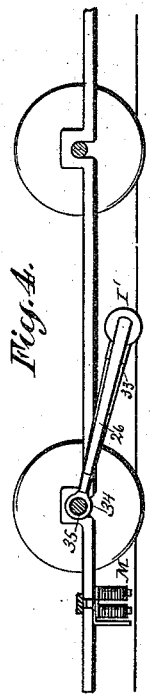
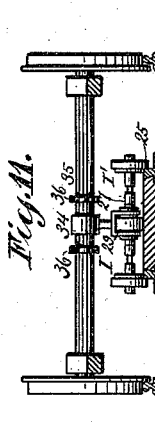
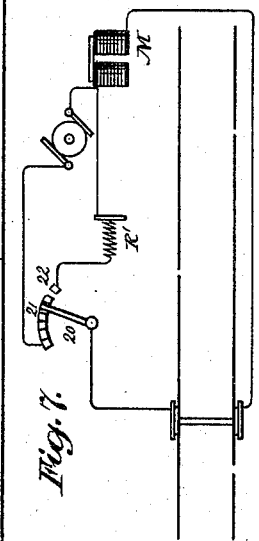
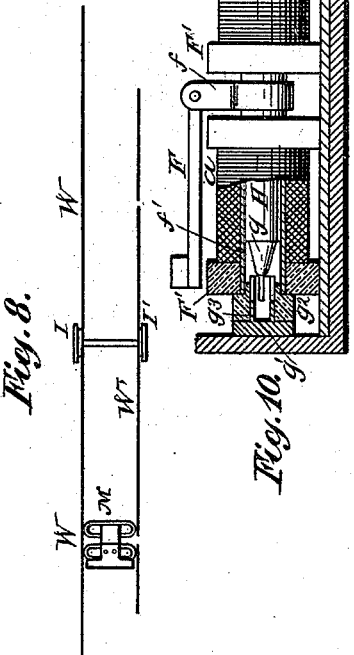
Witnesses:
D. W. Gardner.
Wm. H. Capel.
Inventor:
John. H. Guest.
By H. C. Townsend
Attorney.

(No Model.) 3 Sheets—Sheet 3.
J. H. GUEST.
SUPPLY SYSTEM FOR ELECTRIC RAILWAYS.
No. 537,416. Patented Apr. 9, 1895.
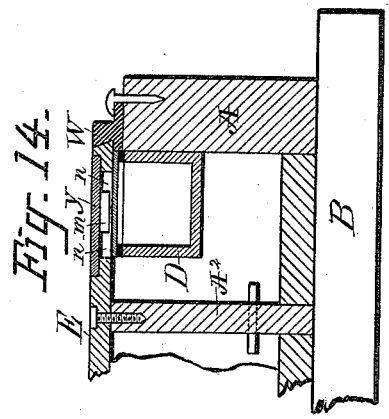
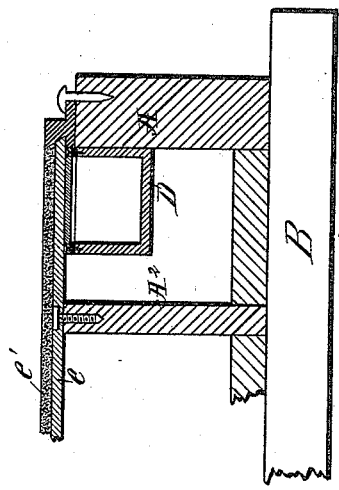
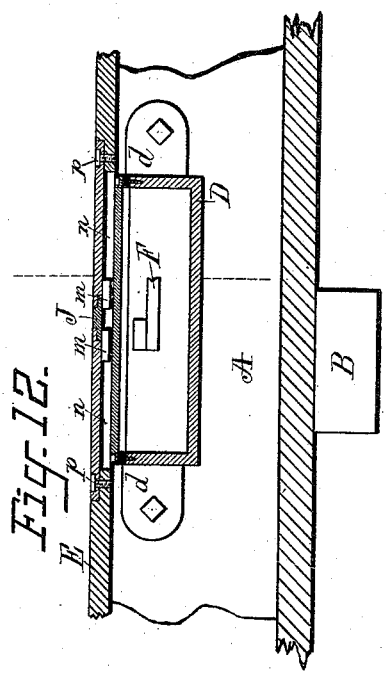
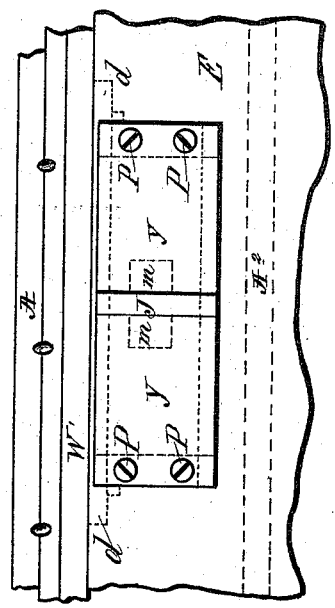
WITTNESSES:
Henry Hirsch.
Wm. H. Capel
INVENTOR:
John H. Guest.
By J. C. Townsend
Attorney.

UNITED STATES PATENT OFFICE.

JOHN H. GUEST, OF BOSTON, MASSACHUSETTS.

SUPPLY SYSTEM FOR ELECTRIC RAILWAYS.

SPECIFICATION forming part of Letters Patent No. 537,416, dated April 9, 1895.

Application filed October 12, 1894. Serial No. 525,683. (No model.)

*To all whom it may concern:*

Be it known that I, JOHN H. GUEST, a citizen of the United States, and a resident of Boston, in the county of Suffolk and State of Massachusetts, have invented a certain new and useful Electric Railway, of which the following is a specification.

My invention relates to electric railways wherein the working conductor from which the car takes up current is divided into sections which are insulated from one another and from the source of power current, and are provided with automatic switches that are actuated to close the connection with the source as the car enters a section and open it when the car leaves the section.

One part of the invention relates to the construction of a sealed conduit containing automatic switch-boxes the switches of which are provided with operating devices actuated by a magnet on the car or vehicle and consists, among other things, in mounting the sections of contact rail or working conductor upon the upper or outer edge of the side of the conduit so that they will be well and firmly supported.

The invention consists also of a longitudinal supporting frame or stringer running through the conduit for supporting or stiffening the center of the cover and provided with connection studs or points for attachment of the wires which interconnect the switches in the various switch-boxes mounted within said conduit.

Another part of the invention consists in the combination with an armature in the conduit actuated by a magnet on the car to establish initial contact, of a switch magnet energized by said initial contact, and a switch actuated by said magnet but mechanically independent of the armature for closing the connection between a section of working conductor and the supply wire or source.

Other improvements in the automatic switch will be more particularly hereinafter described, and then specified in the claims.

My invention consists further in providing the trolley or collector wheel with a flange by which it makes a rubbing or side contact with the working rail or conductor and applying to the said wheel a spring or other device tending to move or press it sidewise so as to cause the flange to bear sidewise against the rail. By this means I secure good contact or connection and also avoid the liability of the wheel to break connection with the rail by up and down movement of the wheel or its support.

The invention consists further in assisting the rotation of the trolley wheel by means of a driving wheel connected therewith and running, preferably, on a surface independent of the trolley rail or working conductor. This driving wheel is preferably mounted on the same axial line with the trolley wheel but might be otherwise mounted and connected with the trolley without departing from the invention. The driving wheel compels the wheel to rotate which it might otherwise fail to do owing to the friction by the side contact made by its flange.

Other details in the construction and mounting of the trolley which are my invention will be described and then more particularly specified in the claims.

In the accompanying drawings:—Figure 1, is a cross section through a conduit constructed in accordance with my invention, and containing the boxes for the automatic magnetic switches. Fig. 2, is a general plan of a portion of the conduit with the cover broken away to show a switch-box. Fig. 3, is a longitudinal vertical section of a portion of the conduit showing one of the switch-boxes at one side thereof. Fig. 4, shows in side elevation the trolley or collector and the manner of supporting the same. Fig. 5, is a plan of said trolley or collector, parts being shown in section to better illustrate the construction. Fig. 6, is a general diagram of the connections of switches and sections of working conductor for a portion of the road. Fig. 7, is a diagram showing the circuits on the car or vehicle. Fig. 8, illustrates diagrammatically, the proper relative disposition of the operating magnet on the car, the trolley wheels or collectors and the sections of working conductor. Fig. 9, shows a modification in the contact for the automatic switch. Fig. 10, is a view of the switch-box with its magnet shown partially in section to disclose the additional switch contacts. Fig. 11, is a vertical transverse section of the truck shown in Fig. 4. Figs. 12, 13, 14 and 15, illustrate modifications in detail.

The conduit which contains the automatic switch-boxes is made of any suitable material but for cheapness I prefer to employ wood properly treated to resist moisture and decay. When made of wood I prefer to employ for it two longitudinal stringers A, A, forming the sides of the conduit and properly bolted or secured to the railway ties or sleepers B. The bottom of the conduit is formed of plank which fills in the space between stringers A, and at its edges where it joins the stringers makes a good water-tight joint. Any suitable means for making the bottom water-tight might be employed.

The sections of working conductor indicated at W, W', are formed of suitable rails adapted for a flange, trolley or collecting wheel to be presently described. These sections of working conductor are employed in two sets forming respectively the positive and negative sides of the system, and the two sides are normally insulated from one another and from the supply wires or conductors indicated at C, C', but as the car progresses are automatically connected to said conductors by the switches and are disconnected therefrom when the trolley wheel leaves the section of rail. The rails W, W', are spiked down upon the top of the stringers, as clearly shown. The stringers afford a rigid and firm foundation for the rails.

E, is the cover plate of the conduit. This cover plate fills the space between the rails W, W', at opposite edges of the conduit and is preferably held at the edges by the overhanging edge of the rail which at the inside is undercut, as shown, and forms at the bottom a shoulder or a seat for the edge of the plank or cover E. This cover may be also made of wood properly treated to resist moisture and decay and in practice need be no more than from nine to twelve inches wide. To afford additional support for the cover a longitudinal stringer or frame A², is provided which runs through the conduit resting upon the bottom thereof, as indicated, and at its top receives the central portion of the cover which latter may, if desired, be bolted to said central support. This central support also carries suitable blocks, studs, or bolts of conducting material preferably extending through and projecting from opposite sides thereof and affording a means whereby the desired inter-connection of the switch circuits and sections of working conductor may be made as will be presently described. This central support A², may be also formed of wood.

D, D', indicate the switch-boxes containing the automatic magnetic switches. Those for the positive side of the system are indicated by the letter D, and those for the negative or opposite side by the letter D'. The switches in boxes D, establish the connections between the leading or main power wire C, and the sections of working conductor W, while the switches in boxes D', perform a similar office for the sections W', by connecting them with the return power wire C'. Suitable packing or cement may be applied at the edges of the cover E, to seal the conduit more effectually. The boxes D, D', are preferably of metal, such as iron, and are fastened in position against the inside of the stringers A, A, immediately beneath the cover E. For this purpose the boxes may be provided with the lugs $d$, through which the fastening bolts pass. The boxes are themselves of metal and are conveniently employed as a part of the circuit or connection for the power current passing from the switch to the working conductor W, W'. The connection between the box and the rail is in such case made by a wire indicated at 5, which at one end is soldered or attached to the lug $d$, and at its other end to the rail W, or W'.

The cover of each switch-box is preferably made of aluminum although any other non-magnetic material will be satisfactory. A suitable gasket is placed between it and the edge of the box to insure a tight joint. (See Figs. 12 and 14.) Such material is employed in order that the magnet carried by the vehicle may operate without interference upon an armature of the switch apparatus within the box D. To assist this action as far as possible the box is supported with its cover against the under side of the cover E, thus bringing the armature as near as possible to the upper surface of the cover E, over which the operating magnet indicated at M, moves.

The leading and return power conductors C, C', are supported on hooks or brackets on the inner side of the sides of the conduit as clearly shown in cross section.

The connections for the switches and coils in the switch-boxes D, D', are made by the wires 1, 2, 3, 4, which may be carried out through an opening in the end of the box in which opening proper sealing material is preferably applied to prevent entrance of moisture at this point.

As will be obvious the manner of constructing the conduit and supporting the boxes and contact rails or conductors hereinbefore described, may be used with any construction of automatic switches within the boxes D, D'. I prefer, however, to employ a switch constructed as will be now described.

F, is an armature of soft iron supported immediately beneath the cover of the switch-box and adapted to be raised against said cover or against a stop in connection with the body of the case or box D, or D', by the influence of a magnet on the car, thus establishing an initial contact or connection with the trolley rail or working conductor to which the box is joined and thereby energizing an electro-magnet the coils of which, indicated at $a$, are in the circuit thus established. Said electro-magnet by operating on its core or armature actuates a switch mechanically independent of F, and establishes and holds a connection independent of that established by F, through which the power current may flow to the working conductor. The armature switch F, is pivoted in a suitable support $f$, of metal which is attached to or carried by a metal tube $f'$, that in turn is supported in blocks of insulation F', resting on the bottom of the box D. These blocks of insulation form the heads of the magnet coil $a$, as well as the magnet coil $b$, the latter being a resetting magnet coil which opens the switch that is closed by the action of $a$, and at the same time pulls down the armature or switch F, by positive action, in case it should tend to remain in circuit closing position.

H, is the core for the electro-magnet or magnets whose coils are indicated at $a$, $b$. This core slides within the metal tube $f'$, and moving therein keeps the interior surface bright and forms good electrical connection between the core and tube. The switch that establishes the connection for the power current when the coil $a$, is brought into action, is formed by a stud or contact piece $g$, on the end of the core and by a suitable socket or contact $g'$, mounted in one end of the tube $f'$, but normally insulated therefrom. The contact $g'$, is preferably a spring contact formed by the split end of a tube or cylinder $g^3$, which in turn passes through a stopper or sleeve of insulation $g^2$, fixed in the open end of tube $f'$. The opposite end of the tube or rod $g^3$, abuts solidly against one end of the case D, or is fastened thereto in any desired way to form a good electrical connection. As will be seen if the tube $f'$, be in connection through suitable wires or conductors with the power circuit wire C or C', then, when the core is drawn to establish the contact at $g$, $g'$, connection will be established through the case D and wire 5, with the contact rail.

The coils $a$, are wound over the tube $f'$, and supported thereon between blocks F'. The coils $b$, are similary supported on the opposite end of the tube. The latter coils operate on the core H, in a direction to open circuit at $g$, $g'$. The end of the tube upon which the coils $b$, are wound is preferably sealed or closed by a stopper or other means, as indicated, to prevent the entrance of moisture.

The armature F, is restored to position to open circuit by means of an arm $f^3$, which extends down into a slot or recess in the core H, as clearly shown. The width of this slot is such as to allow considerable play of the core H, without striking the arm $f^3$. The coils $b$, the terminals of which are indicated at 3, 4, are connected by suitable wires or conductors with the switch of another section of working conductor and in such manner that when the latter switch closes circuit it will establish a connection through coil $b$, thereby drawing the core H, to the right opening the connection for its own section of working conductor and at the same time positively moving the armature F, downward. The one terminal of the coil $a$, connects with the power wire C, and its other terminal connects with the tube $f'$, through the metal support $f$, fastened to the said tube. A continuation 2, of said terminal is joined to the coil $b$, in another box to the rear of the one in question.

The terminals 1, 2, 3, 4, are carried to the connecting rods P, Q, R, S, which are mounted in groups in the central support $A^2$, within the conduit and near each switch-box, as clearly indicated in the diagram and in the plan view. The connection rods or studs Q, R, are inter-connected for the purpose of bringing the circuit of a coil $b$, in one box to and through the switch and working conductor of another box, as will be seen more plainly by the diagram, and as will be now described.

The sections of working conductor W, W', break joint, as indicated, or alternate in position so that the break between sections W', W', is opposite the center of the sections W. Each connection rod P, to which the terminal 1, of any switch magnet coil $a$, runs is joined by a tap wire 6, with the main power wire C or C', and each terminal 2, is joined to a rod or connection bar Q which, by a suitable wire running through the conduit is placed in connection with a bar R, at another switch, to which bar R, a terminal 3, of the coil $b$, at the other switch is joined. The opposite terminal 4, of the coil $b$, is joined to a bar S, which by a connecting wire 10, is placed in connection with a bar P, joined by the tap wire $b$, with the main wire or power circuit C', on the opposite side of the system.

The manner or system of connection will be understood by taking a particular case on the diagram Fig. 6, where the arrow shows the direction in which the car moves over the sections. Thus, for instance, taking the switch for any section on the opposite side of the system, the terminal 1, connects by the wire 6, with the positive conductor C, being joined to the bar P, to which the wire 6, is attached. The terminal 1, connects with the bar or rod Q, and from the latter a wire runs through the conduit rearwardly to the rod R, near the switch for a section two sections to the rear and on the opposite or negative side of the system. At the latter, one terminal 3, of a coil $b$, is connected to said bar R, and its opposite terminal 4, to a bar or rod S, which in turn is in direct connection with a bar P, that is joined by a wire 6, to the positive main conductor C. A similar connection for the terminal 2, of the coils $a$, on the negative side of the system exists. Each terminal 2, is joined to a rod Q, and the latter is joined by a wire running through the conduit with the rod R, for the coil $b$, in a switch of the section on the positive side of the system two sections to the rear. The terminal 4, of the latter switch is joined to a rod S, at that switch which by a connection 10, is joined to a rod P, and thence by a tap 6, with the conductor C', on the negative side of the system. When, therefore, any switch is connected with its section of working conductor, current may flow to or from said section according as it is on the positive or negative side of the system not only by a wire 1, and coil $a$, at said switch, but also by wire 2, at said switch, thence by a bar Q, longitudinal connecting wire, a bar R, at the section two sections removed to the rear and on the opposite side of the system by coil $b$, at the latter section, bar S, wire 10, the bar P, and by tap 6, to the same power wire as that to which the wire 1, is joined. The effect of the current in each coil $b$, is to open the switch at the corresponding section and in each coil $a$, is to close and keep closed said switch as before explained.

The armatures F, are operated upon by electro-magnet M, preferably of the horse-shoe form, having each pole wide enough to embrace the switch-boxes at both sides of the system and having one pole in advance of the other so that on reaching any armature on either side, said armature will be subjected to the action of both poles. The relative position of the magnet to the sections of working conductor and to the trolley wheels I, I', for the two sides respectively of the system, is indicated in Fig. 8. When the magnet reaches position to act on the armature of any section, the trolley wheel I, on the same side of the system should be in position where it will bridge the connection between such section and the next section to the rear on the same side, that is to say, the section which is active and which it is about to leave. This bridging may be obtained by the use of any desired form of trolley or collector and, if desired, a pair of trolleys may be used for each side of the system. Under this condition when the magnet M, draws up the armature F, it will establish a connection as follows, (see Figs. 2, 3 and 6:) from wire C, to a bar P, by connection 6, wire 1, coil $a$, support for armature F, box D, section W, trolley I, motor circuit on the vehicle, the trolley I', on the opposite side, rail W', on which the latter trolley bears and which has already been made active by the operation of the magnet, box D', switch $g, g'$, core H, tube $f'$, coil $a$, conductor 1, wire 6, and to the return C'. By the action coil $a$, energized as just described with reference to section W, on the positive side and the core H, will be drawn along so as to establish the connection $g, g'$, through which now the power current will flow in shunt with the armature F so that should F, be shaken from its connection with the box the power circuit would not be interrupted. The circuit first established by F, would also, momentarily, include the connection to be now described and over which a part of the current flows after the establishment of connection at $g, g'$. This circuit or connection is from the conductor C, through the wire 6, at the second section to the rear on the same side of the system by rod P, wire 10, rod S, at the first section to the rear on the opposite side, coil $b$, by wire 4, terminal 3, rod R, and thence forward to the rod Q, to which the terminal 2, of the coil $a$, at the switch just energized is connected. By this means it will be seen that the section W', at the rear is thrown out of action. When the car moves from the section W, the operation of which switch has been just described, onto the next section W', then the section W, on the positive side one section back will be thrown out of circuit in a similar way. Each switch closed by the action of current in its coil $a$, remains closed until the car has progressed far enough to cause the magnet to operate on the switch F, in the box of the section on the opposite side of the system one half section in advance as may be seen by following out the connections in detail. When such point is reached the switch is thrown out of action by the operation of its coil $b$. The switch retains its position until the coil $b$, is energized owing to the fact that the core works in a horizontal line and unless moved by some external force will retain the position into which it is thrown by the action of the coil $a$.

It will be seen that the operation of the switch involves practically the closing of an initial circuit about the armature F, to initially energize coil $a$, which thereupon operates as a magnet coil to actuate a switch mechanically independent of F, thereby establishing the power circuit or connection for the corresponding section of working conductor and holding it established. Under this condition it is apparent that the armature F, requires to be only momentarily lifted and it may drop back immediately without disturbing the operation or breaking the connection.

To insure the return of the switch F, to normal position, it may be provided with the arm as described which is engaged by the core H, when the main switch $g, g'$, is opened. The use, however, of this arm is discretionary with the constructor and is not essential to the principles of the invention.

The main office of the coil $b$, is to open the circuit established by the action of the coil $a$. While the action of the coil $a$, is ordinarily sufficient to hold the switch $g, g'$, firmly closed, I may, in some instances, insure still further a good contact or connection at this point by allowing the flat end of the core H, to abut against a piece of soft iron as indicated in the modification Fig. 9, where it will be held by the attraction between the two pieces in contact, but ordinarily the device already described will be found sufficient.

The magnet M, preferably, has its coil included in series circuit with the motor as indicated in the diagram Fig. 7. The speed controller for the motor is typified by an arm 20, moving over the series of contacts 21. When the motor circuit is opened, however, the magnet M, would ordinarily be thrown out of action to prevent which I provide a supplemental contact 22, which may be closed by the controller arm 20, and thereby establish a branch connection to the magnet M, as clearly illustrated in the diagram. In this branch I provide a resistance R', which prevents excessive current in the magnet M, when the motor is not running, so as, by its counter electromotive force or by the resistance controlled by 20, to cut down the current.

The trolley wheels I, I', are each provided with a flange indicated at 25, which bears against the shoulder of the contact rail, as shown, and is pressed against the same by springs or other devices indicated at 26, which springs may be attached to any part of the car or truck and pressed against the hubs of the wheels. The wheels themselves have their hubs sleeved upon the ends of a shaft 27, and are insulated from one another by the interposed insulation 28, forming the central section of the shaft. On this central section is fixed a wheel 29, having a rather wide tread which is adapted to move over the cover of the conduit and by friction therewith positively turn the wheels I, I'. The shaft 27, is turned by the wheel 29, and the wheels I, I', are operated through arms 31, engaged by studs or pins 30, carried by the shaft. The shaft and wheel 29, are mounted in the bearings 32, which are supported in the end of an arm 33, in turn loosely sleeved at 34, upon the car axle 35. The sleeve 34, is adapted to slide on the axle but is limited in its sliding movement by the collars 36. This device provides for the turning of curves. The driving wheel 29, causes the wheels I, I', to constantly rotate although they are pressed with considerable force by their flanges 25, against the side of the contact rails. This side or flange contact also insures the preservation of connection with the contact rail although the trolley wheels may have considerable vertical vibration. The weight of the trolley wheels and arm 33, is ordinarily sufficient to preserve good connection, but if desired, springs may be employed for pressing the parts down.

The springs 26, though they may be otherwise mounted, are preferably mounted as shown in Figs. 4 and 5, wherein they are bolted to blocks of insulation 37, secured upon the sides of arm 33. From these springs, suitable flexible conductors, as 38, may be led to the car motor.

Instead of constructing the cover plate E, wholly of wood it may, as shown in Fig. 15, consist of a layer of wood $e$, covered and protected by a layer of cement or asphalt $e'$.

As a means of obtaining access to the switch-boxes suitable openings may be made in the cover plate E, over said boxes and these openings closed by removable plates of iron $y$, secured in place by suitable screws or bolts $p$. These plates $y$, are separated from the rails W, W', by a suitable thickness of the planking or asphalt to insulate them therefrom and are divided transversely by a strip of non-magnetic material J, such as brass. This division is for the purpose of obtaining a better action by the train magnet M, upon the armatures F, as at the time when said magnet is immediately over F, its magnetism which would otherwise be shunted in the plate if it were continuous will be prevented from so doing, by said strip J, and will descend in greater force to the armature F. This descent is also assisted by the lugs or projections $m$, formed upon the under side of plates $y$. The space $n$, between the covers of boxes D, and the plates $y$, may be filled in with gravel or cement as desired.

The core of train magnet M, is preferably made of magnetic steel so that it will be a permanent magnet, and the coils thereon will always keep it saturated.

I do not limit myself to a driving wheel mounted to run upon a surface independent of that on which the trolley wheel runs, nor to any particular means for communicating the movement of the driving wheel to the trolley wheel.

It will be observed that in the system hereinbefore described when the car reaches a section of working conductor and the switch thereof is closed, the section of working conductor next in the rear is not at such time disconnected automatically but is retained in connection until the car has progressed to another section which in the present case is the next section on the opposite side of the system. The object of thus deferring the time when the section shall be thrown out of circuit (and which has heretofore been proposed) is to obviate the possibility of sparking at the switch within the box, which sparking would obviously take place if it were attempted to open the switch while the trolley or collector bears upon the corresponding section of working conductor. This plan shortens to some extent the length of individual sections which it is possible to use without at any time having a live section extend beyond the space protected by the car. The length of sections which may be used is made somewhat greater, however, by alternating and cross connecting the sections of the two sides as described so that as the car establishes connection by the switch of one section, a section on the opposite side instead of the same side of the system shall be thrown out of circuit and while in the system as at first proposed it is necessary to employ three sections of rail to the space covered or protected by the car, or space within which sections may be alive without possibility of persons or animals touching a live section. By thus cross connecting the two sides of the system it becomes necessary to use but two and one half rail lengths for the same space, as will be seen by following the action of the apparatus. When, however, the system is one like that herein described wherein insulated mains and insulated sections of working conductor are employed for both the positive and negative side of the system, it may be deemed in some cases sufficient if the sections are switched out of circuit soon enough to leave at no time both sides exposed and alive; since, if the section at one side only be alive, no circuit can be formed with an exposed conductor on the opposite side unless the latter also be connected by its switch to the power circuit. In this case it becomes feasible to use but one and one half lengths of working conductor to the danger space which is guarded by the car as will be seen by examination of the system. Although there may be now at times as much as one half rail length of connected working conductor exposed either ahead or behind the car it will be found that in all cases the opposite conductor is at such time disconnected from its insulated power wire.

The alternating of the sections so that a live section may project opposite another section on the opposite side of the system without danger provided the latter section is dead thus increasing the length permissible in each of the several sections guarded by the car, is not herein claimed but forms the subject of claims in my prior application for patent, filed June 18, 1894, Serial No. 514,872.

I do not limit myself to any particular construction of electro magnets for operating upon the switches though I prefer to employ solenoid magnets, nor do I limit myself to any particular construction or form of the switch contacts since, as will be obvious, it is not necessary that the switch contact should be formed upon or attached to the core itself. Other modifications in the details of the devices and the manner of making the circuits will readily suggest themselves to electricians. It will also be understood that the means for supporting the side contact trolley wheels and allowing them to move sidewise or in the line of their axis of rotation through the influence of the spring or other device may be varied without departing from the invention.

What I claim as my invention is—

1. The combination with the sealed conduit containing the switch-boxes, of the sectional working conductor formed of contact rails supported upon the conduit edge, as and for the purpose described.

2. In an electric railway, a conduit formed as described, of two longitudinal stringers the space between which at the bottom is closed in, in combination with normally insulated or dead working conductors or rails mounted on the edge of said stringers flush with the street surface.

3. In an electric railway, the combination, substantially as described, of a conduit the sides of which are formed of insulating material, contact rails divided into sections and supported upon the sides of the conduit at their upper edge, said contact rails being normally insulated from the power circuit and forming at the opposite sides of the conduit opposite poles or terminals of the system, and automatic switch-boxes within said conduit for connecting and disconnecting said rails from the main leading and return wires, as and for the purpose described.

4. The combination, substantially as described, with the conduit having the automatic switch-boxes mounted within it, of the longitudinal support for the cover of said conduit, and studs or rods mounted in said support forming means for attachment of the switch terminals and for interconnecting the terminals of different switch boxes.

5. The combination, substantially as described, with a conduit having the sectional contact rails mounted on its edges, of the cover E, the interior support for the same, and the studs or rods of conducting material passing through said support and forming means for attachment of the terminals leading from the switch-boxes, as and for the purpose described.

6. In an electric railway having its working conductor divided into sections normally insulated from one another, a conduit containing automatic switches for connecting and disconnecting said sections from the power wire, and a series or group of studs or pins at each switch-box attached to terminals leading from said switch-box, said pins or studs of different groups being connected to one another as described to form interconnections of different switch-box circuits.

7. The combination in a sectional electric railway, of a magnet on the car, independent armatures therefor on the permanent way, one for each section of working conductor, an electro-magnet whose circuit is initially closed by the said armature, a normally open connection between the power wire and section including coils of said magnet, and an auxiliary switch actuated by said magnet and independent of said armature for closing the power connection.

8. The combination with a section of working conductor, normally disconnected from the power line, of the actuating magnet on the car, an armature therefor on the permanent way for making initial electric connection with said section, and a second switch actuated by the current over the circuit established through said initial contact and the car circuit.

9. The combination with each section of a sectional working conductor in an electric railway, of a power wire or conductor from which each section is normally insulated, a circuit closer or switch for connecting the said section with the power circuit, an electro-magnet for actuating the same and having a coil in a circuit thereof, an armature for closing an initial or energizing circuit of said magnet, a magnet on the car for actuating said armature, and a resetting magnet coil in the circuit closed to another section.

10. The combination, substantially as described, of a magnet on the car, a circuit closing armature F, actuated thereby, and in a direct connection between the feeder and working conductor a magnet coil in the circuit thereof, but normally disconnected from the working conductor a movable core for said coil, and a contact carried by said core for establishing direct connection with the working conductor.

11. The combination, substantially as described, of a magnet on the car, a switch armature F, actuated thereby, and an electro-magnet in the circuit closed by the armature F, said electro-magnet having a movable core which carries a switch contact and engages the armature F, to restore it to normal position when the core is retracted.

12. The combination with the two lines of sectional working conductor forming the positive and negative sides of the system and switches for connecting the same with the power circuits or conductors, of resetting electro-magnets operating on said switches to open the connections, the coils of the resetting magnets for one side being in the connections of the sections of working conductor for the other side.

13. The combination with the two lines of working conductor forming plus and minus sides of the system and the switches therefor, of resetting coils for the switches of each side controlled over the circuits of the sections on the other side.

14. The combination in an electric railway, of two lines of automatic switches belonging respectively to the positive and negative sides of the system, and an electro-magnet on the car both of whose poles embrace the boxes on both sides of the system, as and for the purpose described.

15. The combination in an electric railway, of an automatic switch on the permanent way for closing the connection of a section of working conductor and an electro-magnet on the car for operating directly upon the movable member of said switch for closing the same, said magnet being included in series circuit with the motor, a branch connection around said motor including said magnet, and a resistance approximately equal to that offered by the motor and a switch for throwing said resistance into circuit at the time of throwing the motor out of circuit.

16. The combination with a rotary shaft, of a flanged trolley wheel mounted to slide thereon and to rotate therewith and having a conducting tread bearing upon the contact rail or conductor, a spring operating on said wheel in an axial direction to press its conducting flange against the side of the rail on which the tread bears, and an independent driving wheel secured to said rotary shaft.

17. The combination with a working conductor, of a trolley or collector wheel making frictional or rubbing contact therewith, an independent driving trolley wheel running on a surface independent of said working conductor, and means for pressing the trolley wheel into rubbing connection with the working conductor.

18. In an electric railway, the combination with a pair of trolley wheels and a pair of contact rails or conductors forming the plus and minus sides of the circuit, of a driving wheel mounted between said trolley wheels and running on a surface insulated from said conductors.

19. The combination, substantially as described, of the trolley shaft having its ends insulated from one another, the driving wheel mounted on the shaft but insulated therefrom, and the trolley wheels mounted on the ends of the shaft.

20. The combination with the trolley shaft, of the driving wheel fixed to the center of the shaft but insulated therefrom, and the trolley wheels journaled on the ends of said shaft and adapted to slide thereon axially.

21. In an electric railway, a trolley arm journaled on the car axle, combined with limiting rings or collars fixed to the axle and permitting a play of the trolley arm between them in passing curves.

22. In an electric railway, a trolley arm journaled on the car axle, flanged trolley wheels adapted to slide axially upon their journals, and springs connected to said arm and bearing upon said wheels for the purpose set forth.

23. In an electric railway, a conduit having longitudinal stringers forming the sides thereof, in combination with rails forming working conductors mounted upon said stringers, and a cover plate of insulating material extending from one line of rails to the other.

24. In an electric railway, a conduit having a cover plate extending from one line of rails to the other and consisting of a layer of wood surmounted by a layer of cement flush with said rails.

25. The combination with a vehicle carrying a switch-operating magnet one pole of which follows in line with the other, of switches for operation by said magnet located along the line of way, and cover plates over said switches consisting of magnetic material divided transversely down to the switch operating magnet by non-magnetic material for the purpose set forth.

26. The combination, with the conduit and the automatic switches, of the cover plate for the conduit made of magnetic material and provided with openings over said switches, and plates for closing said openings divided down to the space containing the switches by a strip of non-magnetic metal for the purpose set forth.

27. The combination, with the conduit and the automatic switches, of the cover plate for the conduit provided with openings over said switches, and plates of magnetic material for closing said openings each divided by a strip of non-magnetic material and each division thereof provided with a lug or boss of magnetic material in the vicinity of the armature, as and for the purpose set forth.

Signed at Boston, in the county of Suffolk and State of Massachusetts, this 9th day of October, A. D. 1894.

JOHN H. GUEST.

Witnesses:
G. LOUIS SNEADEN,
GEO. R. SNEADEN.